United States Patent [19]

Saxe

[11] 4,270,841

[45] * Jun. 2, 1981

[54] LIGHT VALVE CONTAINING SUSPENSION OF PERHALIDE OF ALKALOID ACID SALT

[75] Inventor: Robert L. Saxe, New York, N.Y.

[73] Assignee: Research Frontiers Incorporated, Plainview, N.Y.

[*] Notice: The portion of the term of this patent subsequent to Apr. 22, 1997, has been disclaimed.

[21] Appl. No.: 956,418

[22] Filed: Oct. 31, 1978

[51] Int. Cl.³ .............................................. G02F 1/01
[52] U.S. Cl. .................................... 350/374; 252/300; 350/397; 350/356; 350/362; 546/134
[58] Field of Search ............... 252/300; 350/150, 154, 350/356, 362; 546/134

[56] References Cited

U.S. PATENT DOCUMENTS

| | | | |
|---|---|---|---|
| 1,951,664 | 3/1934 | Land | 350/154 |
| 1,955,923 | 4/1934 | Land | 350/150 |
| 2,176,516 | 10/1939 | Wilmanns et al. | 350/154 |
| 2,178,996 | 11/1939 | Land et al. | 350/154 |
| 2,289,712 | 7/1942 | Land et al. | 350/154 |
| 3,512,876 | 5/1970 | Marks | 350/362 |
| 3,773,684 | 11/1973 | Marks | 350/267 |
| 4,131,334 | 12/1978 | Witte et al. | 350/150 |

*Primary Examiner*—Deborah L. Kyle
*Attorney, Agent, or Firm*—Jacobs & Jacobs

[57] ABSTRACT

A light valve comprises a cell containing a suspension of light-polarizing particles in a liquid suspending medium, the light polarizing particles being particles of a light-polarizing perhalide of a polycarboxylic acid salt of an alkaloid.

12 Claims, No Drawings

LIGHT VALVE CONTAINING SUSPENSION OF PERHALIDE OF ALKALOID ACID SALT

The present invention relates to light valves, and more particularly to light valves containing suspensions of light-polarizing materials.

Light valves comprising a suspension of light-polarizing particles, preferably colloidal in size, contained within a cell, have been known for many years. Suspensions of herapathite particles in a suitable liquid have heretofore been commonly used, although other types of particles have also been suggested. Light valve suspensions of polarizing materials in general and of herapathite in particular are disclosed in U.S. Pat. No. 1,955,923 (Land).

In general, the shape of the particles used in a light valve suspension should be such that in one orentation they intercept more light than in another orientation. Particles which are needle-shaped, rod-shaped, lath-shaped, or in the form of thin flakes, have been suggested. Although the particles may variously be light-absorbing or light-reflecting, polarizing, birefringent, metallic or non-metallic, it has been found that light-polarizing crystals are optically desirable because a relatively small concentration of them in suspension can provide a relatively large change in optical density between the activated and unactivated states of the light valve.

A variety of light polarizing particles have been proposed in the prior art, but these particles have always been perhalides of an inorganic acid salt of an alkaloid, such as herapathite (quinine bisulfate periodide). A wider choice of light-polarizing materials is desirable, primarily because the spectral characteristics of light-polarizing particles vary according to the particle's chemical composition; hence, new types of polarizing particles can increase the variety of colors and spectral properties obtainable from polarizing materials.

It is therefore an object of this invention to provide light valves that employ a wider variety of light-polarizing materials than heretofore.

The present invention is based on the provision of a light valve that employs a suspension of particles of a light-polarizing halide of a salt of an alkaloid and a polycarboxylic acid, the polycarboxylic acid containing, if desired, one or more hydroxy groups. These particles are of a different color and/or have different spectral properties than the prior art halides of inorganic acid salts. The term "alkaloid" is used herein to mean an organic nitrogenous base, as defined in Hackh's Chemical Dictionary Fourth Edition, McGraw-Hill Book Company, New York, 1969.

In carrying out the present invention, the polycarboxylic acid moiety of the light-polarizing material is an aromatic, aliphatic or cycloaliphatic organic acid having at least two carboxylic acid groups. If desired, the polycarboxylic acid may also contain one or more hydroxy groups. Preferably, the polycarboxylic acid has two to six carboxylic acid groups and zero to six hydroxy groups. Most preferably, the polycarboxylic acid is symmetrical. As a practical matter, the polycarboxylic acid will be chosen from those readily available, such as aliphatic, cycloaliphatic or aromatic polycarboxylic acids of up to 25 carbon atoms with 2–4 carboxylic acid groups and 0–6 hydroxy groups, but any polycarboxylic acid can be used if its molecule, including substituent groups, desirably changes the spectral characteristics of the perhalide crystal and/or the solubility of the polycarboxylic acid salt of the alkaloid or of the perhalide.

Examples of useful polycarboxylic acids include the polyalkanoic acids, such as oxalic, malonic, succinic, glutaric, adipic, pimelic, suberic, azelaic and sebacic acid; polyalkenoic acids, such as fumaric, maleic, mesaconic, glutaconic, itaconic, musconic and aconitic acid; hydroxypolyalkanoic and hydroxypolyalkenoic acids, such as malic acid, tartaric acid, citric acid, and acids obtained by oxidation of monosaccharides such as mucic acid, trihydroxyglutaric acid and xylonic acid, and the like; and aromatic polycarboxylic acids, such as terephthalic and pyromellitic acid and naphthyl dicarboxylic acid.

The alkaloid moiety of the light polarizing material may be any of the alkaloids that have been used to form light polarizing halides of alkaloid inorganic acid salts. See, for example, U.S. Pat. No. 2,176,516, which refers to light polarizing halides of salts of inorganic acids and heterocyclic organic nitrogen bases. Preferably, the alkaloid is a quinine alkaloid, as defined in Hackh's Chemical dictionary, supra. U.S. Pat. Nos. 1,951,664, 2,178,996 and 2,289,712 refer in detail to quinine alkaloid inorganic acid salts, and any of the alkaloids set forth therein are useful in the present invention.

Examples of useful alkaloids include heterocyclic organic nitrogenous bases such as pyridine, picoline, diphenyl oxazole, quinoline and quinaldine; quinine, cinchonidine, hydrocinchonidine, hydrocinchonine and other quinine alkaloids; and toluidine and the like.

Many of the alkaloid salts are available, such as quinine bitartrate, oxalate, succinate and tartrate; caffeine citrate; and cinchonidine tartrate. Where not available, the desired polycarboxylic acid salt is readily prepared by reacting the alkaloid and polycarboxylic acid in an acid base reaction.

Formation of the light polarizing perhalides of alkaloid acid salts are well known in the art, and comprises the reaction of the alkaloid acid salt with a mixture of elemental iodine and a hydrohalide acid or ammonium or metal halide or a mixture thereof, in a suitable solvent, such as an alcohol or etheralcohol. See U.S. Pat. Nos. 1,951,664, 2,176,516 and 2,289,72. The halide is usually an iodide, but can also be a bromide or chloride. Preferably, the reaction to form the perhalide takes place in the presence of a protective colloid, such as nitrocellulose or a copolymer as disclosed in U.S. Ser. No. 932,512 filed Aug. 10, 1978, now U.S. Pat. No. 4,164,365, issued Aug. 14, 1979. The light polarizing materials used in the light valve of the present invention are formed in the same way by reacting the polycarboxylic acid salt of the alkaloid with iodine and the halide.

After the light polarizing perhalide particles are formed, they are suspended in a liquid, suspending medium. As is known, the liquid suspending medium may be virtually any electrically resistive liquid so long as it suspends the light-polarizing particles and dissolves the polymeric stabilizer. Esters, nitrobenzene, and oils and other liquids have been recommended for use as the liquid suspending medium. See U.S. Pat. Nos. 1,951,664, 2,290,582 and others. Preferably, the liquid suspending medium has a relatively high electrical resistivity and low pressure, and does not degrade or attack the particles or other components of the suspension. Organic esters useful as the suspending medium include isopentyl acetate, dioctyl phthalate, diisodecyl adipate, paranonylphenyl acetate and dioctyl sebacate. Non-solvents for the stabilizing polymer may also be used as part of the suspending medium if they do not cause the polymer to precipitate; it is important that the stabilizing polymer be well dissolved when the suspension is used in a light valve.

In order to help stabilize the suspension, the protective colloid is used to prevent agglomeration or settling. As is known, the particles are small in size, preferably colloidal.

Both electric and magnetic fields have been proposed for aligning particles in a light valve although electric fields are more common. To apply an electric field, conductive area electrodes are provided on a pair of oppositely disposed walls of a light valve cell, and an electric potential applied thereto. The electrodes may be thin transparent conductive coatings on the inner sides of the front and rear walls of the cell, thereby forming an ohmic type cell wherein the electrodes are in contact with the fluid suspension. It has also been suggested to cover the electrodes with a thin layer of transparent material such as glass in order to protect the electrodes. Such thin layers of glass form dielectric layers between the electrodes and the fluid suspension, and the cells may be termed capacitive cells. Direct, alternating and pulsed voltages have been applied to the electrodes in order to align the particles in the fluid suspension. When the voltage is removed, the particles return to a disoriented random condition due to Brownian movement.

Commonly the front and rear walls of the cell are transparent, for example, panels of glass or plastic. With no applied field, and random orientation of the particles, the cell has a low transmission to light and accordingly is in its "closed" condition. When a field is applied, the particles become aligned and the cell is in its "open" or light transmitting condition. Instead of making the rear wall transparent, it may be made reflective or a reflective layer may be placed behind it. In such case, light is absorbed when the cell is unenergized and is reflective when the cell is energized. These principal actions may be modified by employing light-reflecting rather than light-absorbing particles.

The present invention is illustrated by the following Examples. All parts and proportions are by weight, unless otherwise noted:

EXAMPLE I

| Periodide Of Quinine Terephthalate | |
| --- | --- |
| Solution A | |
| 3.75 g. | quinine terephthalate |
| 20.00 g. | 2-ethoxyethanol |
| Solution B | |
| 10.00 g. | tricresyl phosphate |
| 42.52 g. | of a 33⅓% solution of nitrocellulose in 2-ethoxyethanol. The nitrocellulose is a mixture of low viscosity (18.6 cps) and high viscosity (17 second) types, 50% each. |
| 0.25 g. | $H_2SO_4$ (97%), as a catalyst. |
| Mix solution A with Solution B to form Solution C. | |
| Solution D | |
| Combine: | |
| 0.49 g. | $CaI_2$ |
| 12.00 g. | n-propanol |
| 3.04 g. | $I_2$ |
| 35.00 g. | tricresylphosphate |
| Shake well for 15 minutes to form Solution D. | |

Solution C is combined with Solution D, with vigorous mixing. Within several minutes, a product is formed. This product, which includes a very large number of extremely small particles of the periodide of quinine terephthalate, is referred to as a "wet paste".

Drying is accomplished by spreading the wet paste as a film about 12 mils thick on a glass plate at ambient conditions, and allowing the volatile solvents in the wet paste to evaporate until there is no significant odor from it (about three hours). The resulting product is referred to as a "dry paste". Use of tricresyl phosphate, a high boiling point plasticizer, in the above formulation, is optional. However, its use can facilitate the spreading of the wet paste and subsequent dispersion of the dry paste into a liquid suspending agent.

EXAMPLE 2

Example 1 is repeated, except that quinine pyromellitate is substituted for quinine terephthalate.

EXAMPLE 3

Example 1 is repeated except that quinine mucate is substituted for quinine terephthate.

Crystals of the periodides of Examples 1, 2 and 3 were examined under a microscope to observe the color of the crystals and the color and quality of the area formed when the axes of the crystals are crossed. As a comparison, crystals of herapathite, quinine bisulfate periodide, were similarly viewed. The results are reported in Table 1 below.

TABLE I

| | | Area formed by Crossed Crystals | |
| --- | --- | --- | --- |
| | Crystals | Color | Quality |
| Quinine terephthalate periodide | red-brown | grey | good |
| Quinine pyromellitate periodide | red-brown | grey | good |
| Quinine mucate periodide | translucent | black | excellent |
| Quinine bisulfate periodide | nearly transparent | blue-black | very good |

PREPARATION OF STARTING MATERIALS

A. Quinine terephthalate

Four grams of quinine were dissolved in 100 cc n-propanol with warming to form Solution I. 1.7 g. Terephthalic acid and 50.0 g. $H_2O$ were mixed to form a slurry, which was combined with Solution I at 75°C. The mixture was heated to boil and held for 10 minutes, after which it was cooled to room temperature. The reaction product was filtered and the cake washed with acetone. Yield 4.28 g. of feathery-white crystals. MP 242° C. (decomp.).

B. Quinine pyromellitate

Four grams of quinine, 2.6 g. pyromellitic acid and 50.0 g. $H_2O$ were combined with stirring and heated to 80° C. 310.0 cc ethanol and 5.0 cc n-propanol were added and the mixture held at 70°-80° C. for about 30 minutes. The reaction product was filtered hot and 3.62 g. of dry cake, M.P. 220° C. (not sharp) was obtained.

C. Quinine Mucate

A mixture of 38.0 g. quinine, 22.2 g. mucic acid and 600.0 $H_2O$ was heated to 95° C. (pH-5.0). The mixture was held at 95°-98° C. for 15 minutes until insolubles were almost all dissolved, and then it was filtered hot. The filtrate was cooled between 0° and 5° C. for 12 hours and then filtered. The cake was washed with acetone and then dried. Yield-25.65 g. white to slight buff crystals. M.P. 202°-204° C.

Examples 1 is repeated, except that hydrocinchonidine terephthalate is substituted for quinine terephthalate, and 10.00 g. H₂O is added to Solution A.

EXAMPLE 5

Example 1 is repeated, except that hydrocinchonidine pyromellitate is substituted for quinine terephthalate, and 10.00 g. H₂O is added to Solution A.

EXAMPLE 6

Example 1 is repeated except that hydrocinchonidine mucate is substituted for quinine terephthate, and 10.00 g. H₂O is added to Solution A.

Hydrocinchonidine terephtalate, pyromellitate and mucate are prepared by using the procedure set forth in Preparation of Starting Materials by substituting hydrocinchonidine for quinine.

EXAMPLE 7

The dry paste from Examples 1-6 is dispersed in dioctyl sebacate as the liquid suspending medium, in the proportion of 1 part of dry paste to 2 parts of dioctyl sebacate, by means of ultrasonic agitation for 10 hours using a Bransonic 32 ultrasonic mixer. (Branson Instrument Co., Stamford, Conn.). Light valve cells are filled with the suspensions to form light valves.

Calcium iodide was used in Examples 1, 2 and 3 because the light-polarizing particles can be made extremely small in size, and is thus preferred. However, a wide choice of alternative iodides is available including, for example, KI, NH₄I, RbI, CsI, etc. Other iodides are substituted for calcium iodide on an iodine-equivalent basis.

The halide used to form the light-polarizing material can be a chloride, bromide or iodide, or a mixture of halides. Substitution of bromine atoms for iodine atoms tends to change the spectral characteristics of the resulting light-polarizing particles, generally shifting them from dark blue for a periodide toward the red-brown for a perbromide, with intermediate shades expected for particles incorporating a combination of bromine and iodine atoms. The term "perhalide" as used herein includes all such combinations as well.

Substitution of one polycarboxylic acid for another in forming a given type of perhalide light-polarizing particle affects the spectral absorption and transmission characteristics of the particles because each major component of such a compound makes a contribution to the overall spectral properties of the material. However, the effect is usually substantially less than that which occurs when changing the type of halogen used in the particle.

One important advantage of using an alkaloid polycarboxylic acid salt to form the perhalide, is the opportunity to "tailor" the solubiltiy of the alkaloid acid salt by incorporating alkyl, aromatic, and/or other groups into the polycarboxylic acid and hence into the alkaloid acid salt. This is important depending on whether one wishes to conduct the halogenation reaction of the acid salt with the halogen and halide to form perhalide particles in water or in non-aqueous media or a combination thereof. Usually, however, it has been found most convenient to conduct the reaction in non-aqueous media or a mixture of such media with a minority of water. The reason for this is that one usually wishes to perform the halogenation reaction in the presence of a suitable stabilizing polymer so as to hold down average particle size and reduce formation of aggregates. The polymer generally stays with the particles through their dispersion into a final suspending medium, as described in Examples 1-7 and it is thus important that the polymer be soluble in both the halogenation reaction solvents and the liquid suspending medium. Since it is extremely difficult to find a suitable polymer that is both soluble in water and also widely soluble in low polarity liquids, an alcohol or ether-alcohol soluble alkaloid acid salt is preferred so that solubility requirements for the polymer can be more easily met. By means of the present invention, it is easier to meet these solubility requirements.

I claim:

1. In a light valve, comprising a cell containing a suspension of light-polarizing particles in a liquid suspending medium, the improvement wherein said light polarizing particles are particles of a light-polarizing perhalide of a polycarboxylic acid salt of an alkaloid.

2. The light valve according to claim 1, wherein said polycarboxylic acid is an aromatic, aliphatic or cycloaliphatic organic acid having at least two carboxylic acid groups.

3. The light valve according to claim 2, wherein polycarboxylic acid contains at least one hydroxy group.

4. The light valve according to claim 2, wherein said polycarboxylic acid has two to six carboxylic acid groups and zero to six hydroxy groups.

5. THe light valve according to claim 2, wherein said polycarboxylic acid is symmetrical.

6. The light valve according to claim 2, wherein said polycarboxylic acid contains up to 25 carbon atoms with 2-4 carboxylic acid groups and 0-6 hydroxy groups.

7. The light valve according to claim 1, wherein said polycarboxylic acid is selected from the group consisting of oxalic, malonic, succinic, glutaric, adipic, pimelic, suberic, azelaic, sebacic, fumaric, maleic, mesaconic, glutaconic, itaconic, muconic, aconitic, malic, tartaric, citric, mucic, trihydroxyglutaric, xylonic, terephthalic, pyromellitic, and naphthyl dicarboxylic acid.

8. The light valve according to claim 1, wherein said light polarizing perhalide is cinchonidine terephthalate periodide, cinchonidine pyromellitate periodide, cinchonidine mucate periodide, quinine terephthalate periodide, quinine pyromellitate periodide, or quinine mucate periodide.

9. The light valve according to claim 1, wherein said alkaloid is a heterocyclic organic nitrogen base.

10. The light valve according to claim 9, wherein said alkaloid is a quinine alkaloid.

11. The light valve according to claim 1, wherein said alkaloid is selected from the group consisting of pyridine, picoline, diphenyl oxazole, quinoline, quinaldine, caffeine and toluidine.

12. The light valve according to claim 11, wherein said quinine alkaloid is selected from the group consisting of quinine, cinchonidine.

* * * * *

UNITED STATES PATENT AND TRADEMARK OFFICE
CERTIFICATE OF CORRECTION

PATENT NO. : 4,270,841

DATED : June 2, 1981

INVENTOR(S) : Robert L. Saxe

It is certified that error appears in the above—identified patent and that said Letters Patent is hereby corrected as shown below:

Claim 12, line 3, after "quinine" delete the comma and insert

-- and --.

Signed and Sealed this

Fifteenth Day of September 1981

[SEAL]

Attest:

Attesting Officer

GERALD J. MOSSINGHOFF

Commissioner of Patents and Trademarks